Aug. 6, 1929.  W. H. SCHMITT  1,723,445
VEHICLE SPRING CONTROLLING DEVICE
Filed May 9, 1927  4 Sheets-Sheet 1
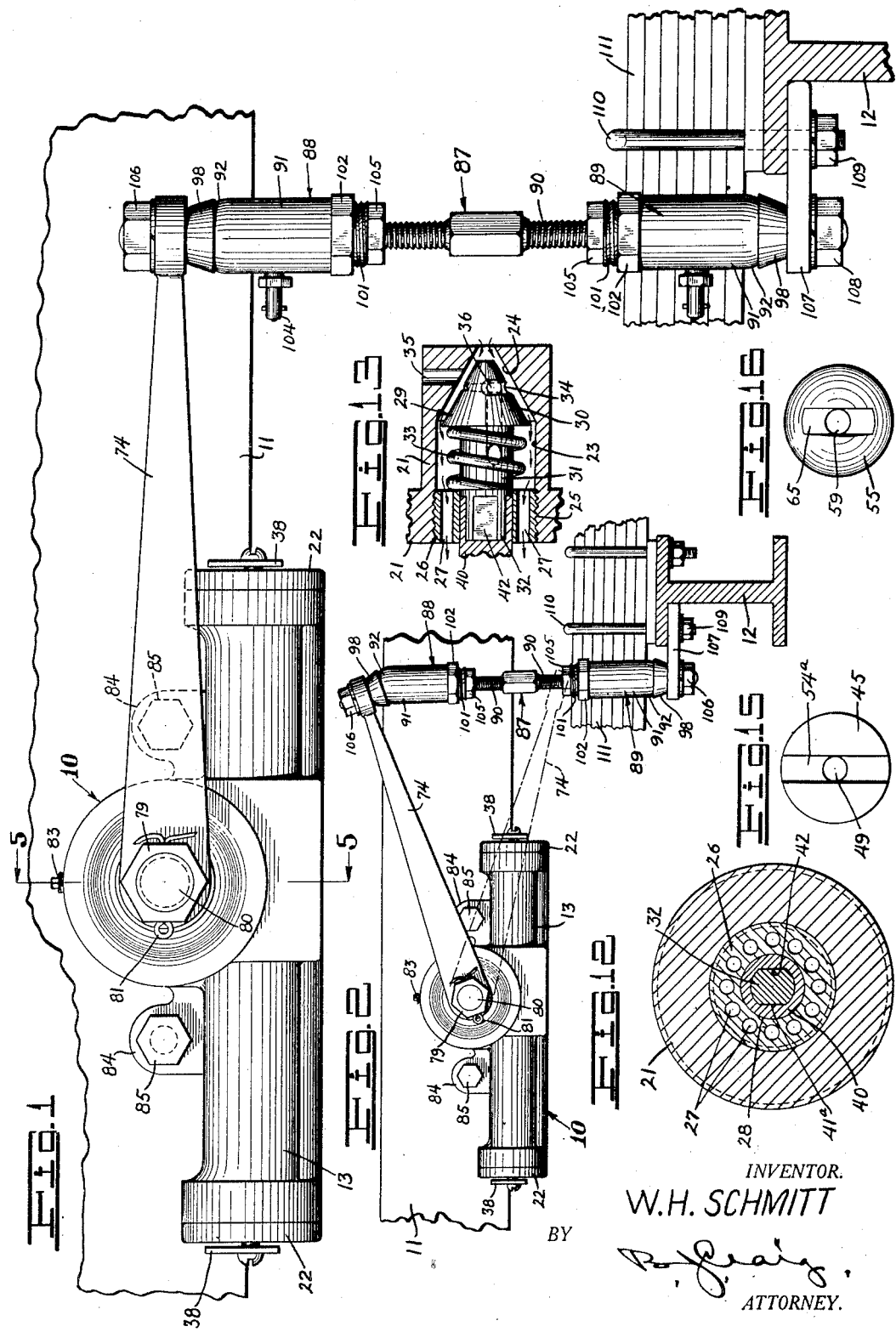
INVENTOR.
W.H. SCHMITT
BY
ATTORNEY.

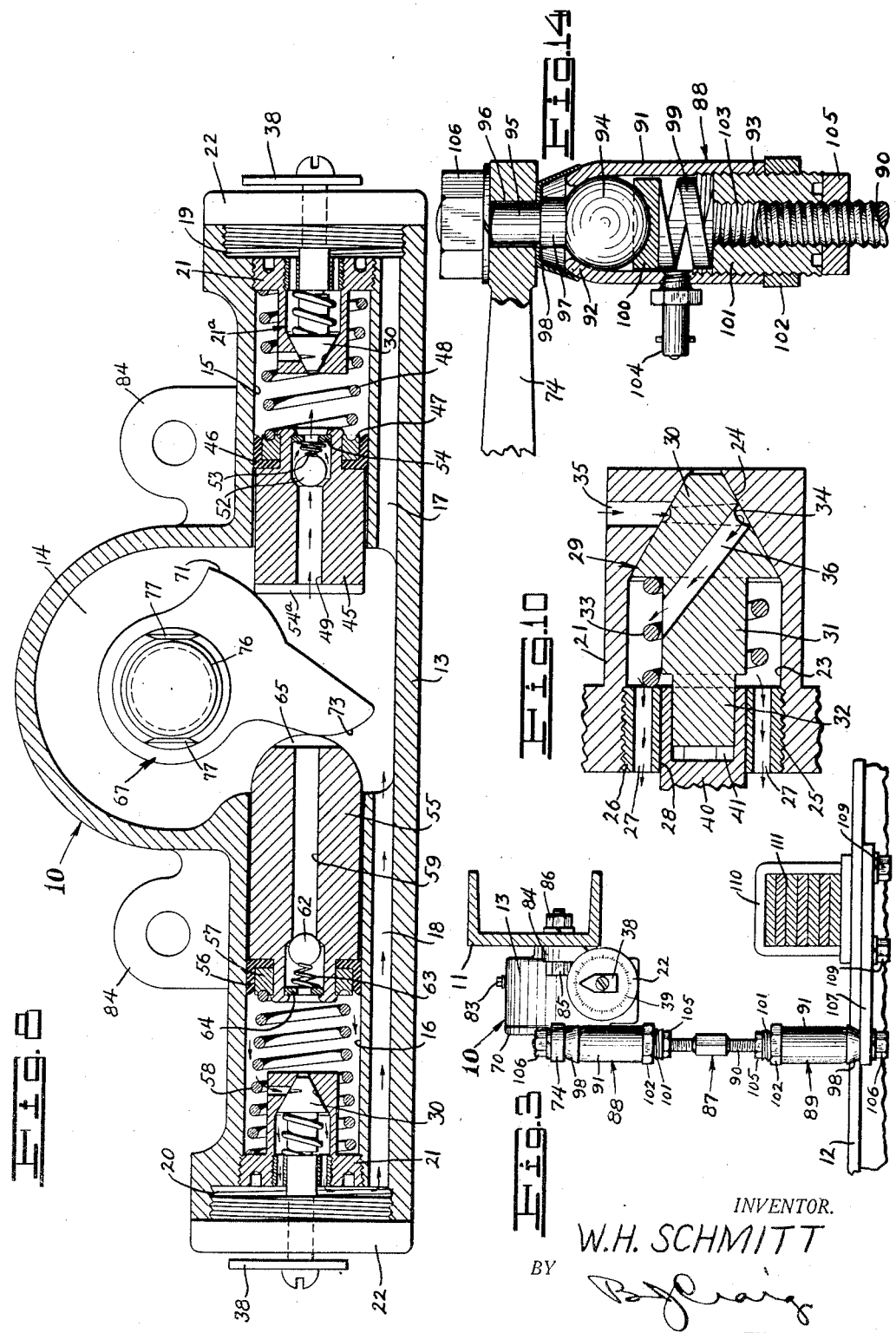

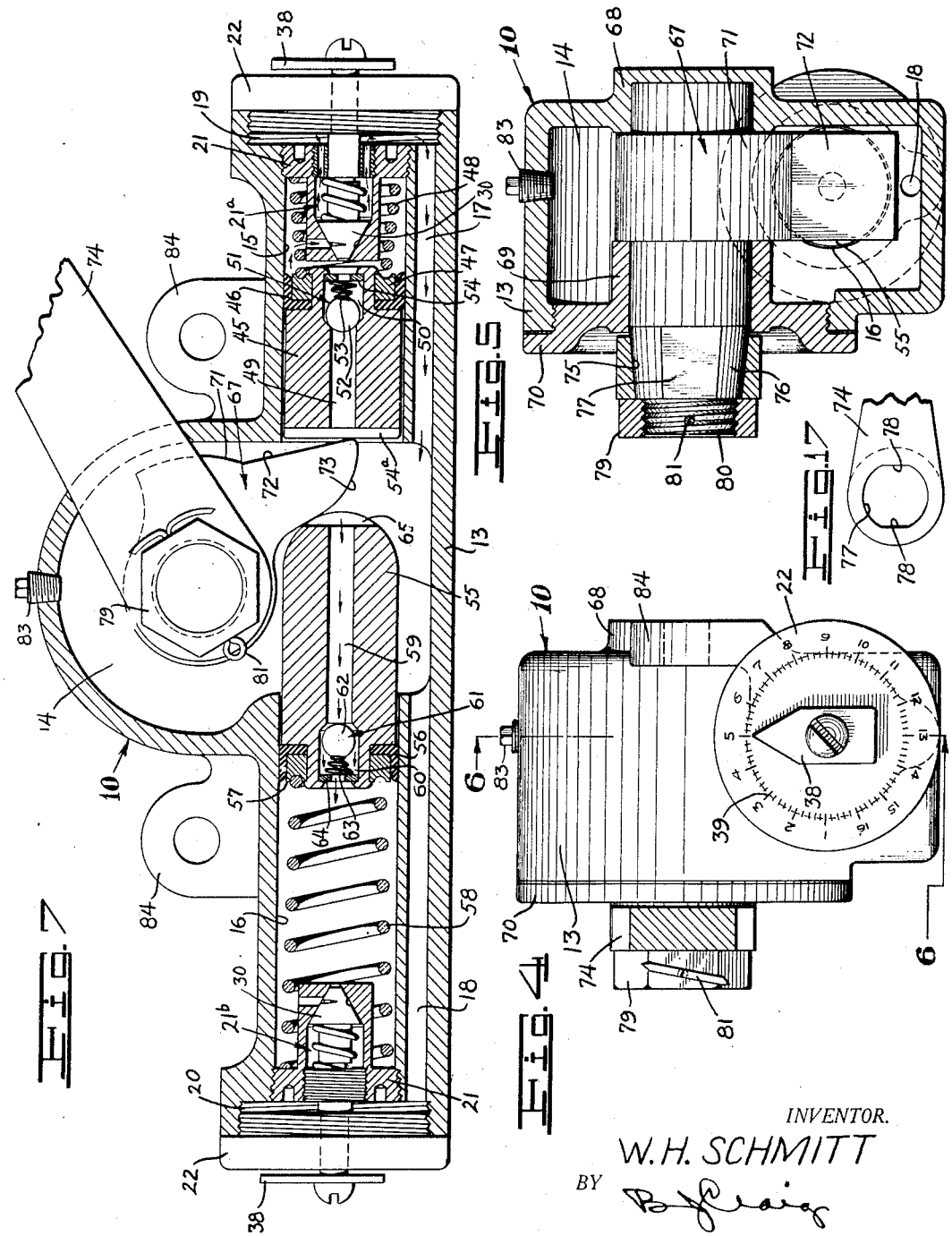

Aug. 6, 1929.  W. H. SCHMITT  1,723,445
VEHICLE SPRING CONTROLLING DEVICE
Filed May 9, 1927   4 Sheets-Sheet 4
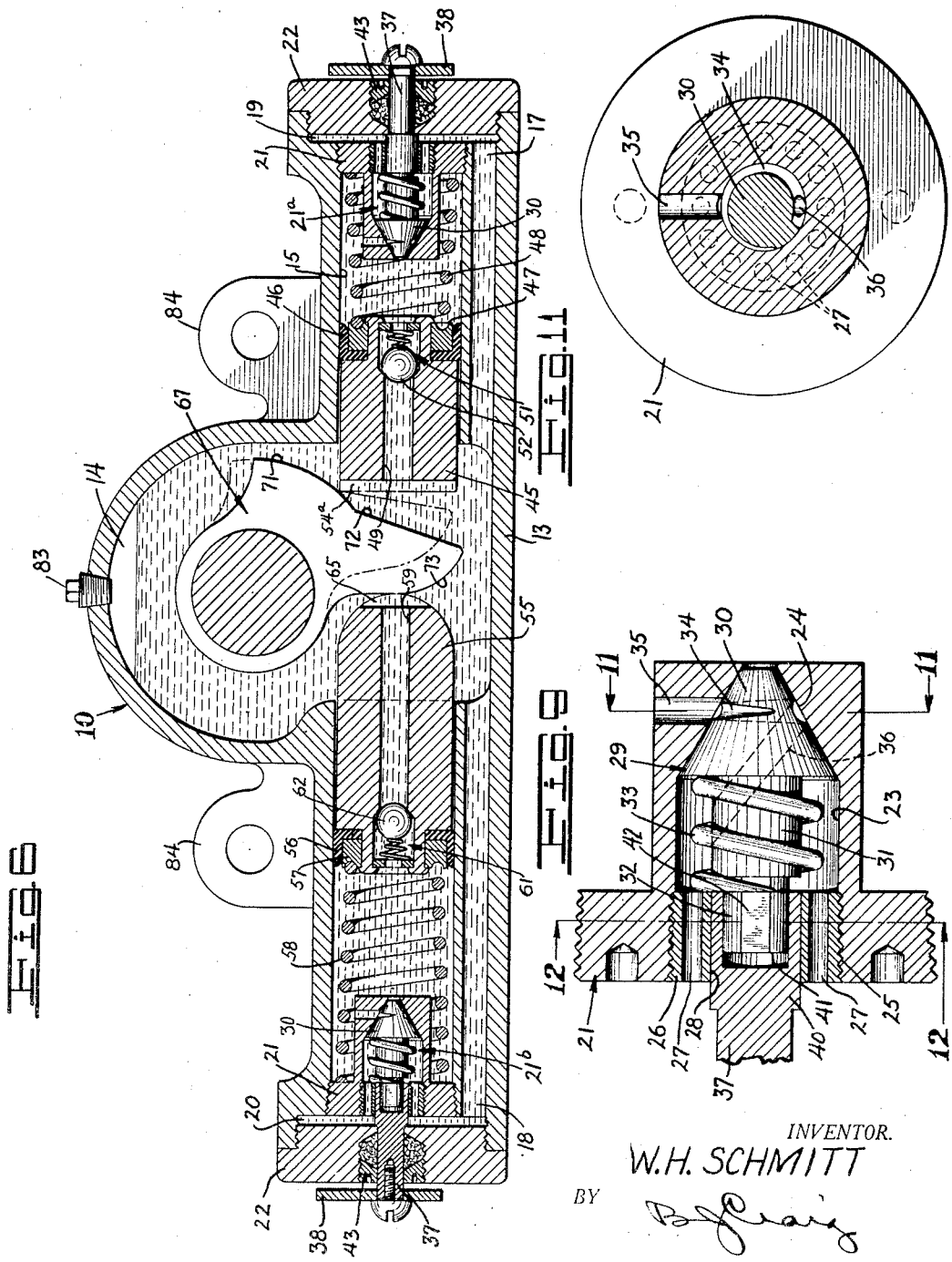
INVENTOR.
W.H. SCHMITT
BY
ATTORNEY.

Patented Aug. 6, 1929.

1,723,445

UNITED STATES PATENT OFFICE.

WILLIAM H. SCHMITT, OF LONG BEACH, CALIFORNIA, ASSIGNOR TO ROBERT V. FUNK, OF LONG BEACH, CALIFORNIA.

VEHICLE SPRING-CONTROLLING DEVICE.

Application filed May 9, 1927. Serial No. 190,097.

This invention relates to improvements in vehicle spring controlling devices.

The general object of this invention is to provide an improved hydraulic spring controlling device which controls the spring action throughout the entire rebound stroke and during the latter portion of the down stroke of the spring.

Another object of this invention is to provide novel valve means for controlling the retarding action of a spring controlling device.

A further object of the invention is to provide a novel type of overload valve for a spring control mechanism.

Still another object of the invention is to provide a novel means for connecting a spring control device and a vehicle.

Other objects and advantages of this invention will be apparent from the following description taken in connection with the accompanying drawing wherein:

Fig. 1 is a side elevation of my improved hydraulic spring control device showing it as secured to the chassis frame and connected to the front axle of a vehicle.

Fig. 2 is a view similar to Fig. 1 showing the actuating lever in a rebound position in broken lines and in a down stroke position in full lines.

Fig. 3 is a front end view of the device in an operative position on a vehicle.

Fig. 4 is an enlarged end view of the device.

Fig. 5 is a section taken on line 5—5 of Fig. 1.

Fig. 6 is a longitudinal section of the device taken on line 6—6 of Fig. 4 showing the device in a neutral position.

Fig. 7 is a view similar to Fig. 6 showing the device in a down stroke position.

Fig. 8 is also a view similar to Fig. 6 showing the device as actuating on a rebound stroke.

Fig. 9 is an enlarged longitudinal section of one of the control valves showing the male portion of the valve in elevation.

Fig. 10 is a view similar to Fig. 9 showing the whole of the valve mechanism in section.

Fig. 11 is a section taken on line 11—11 of Fig. 9.

Fig. 12 is a section taken on line 12—12 of Fig. 9.

Fig. 13 is a view similar to Fig. 9 showing the valve as actuated by an overload.

Fig. 14 is an enlarged sectional view of the upper end of the connection between the actuating lever and the vehicle.

Fig. 15 is an inner end view of one of the pistons.

Fig. 16 is an inner end view of the other piston used in my device; and

Fig. 17 is a fragmentary front view of the actuating lever showing the shape of the bore therein.

Referring to the drawings by reference characters I have indicated my device generally at 10 and shown it as rigidly attached to a side channel 11 of a vehicle chassis and flexibly connected to the front axle 12 of the vehicle.

The device 10 comprises a housing 13 having therein a chamber 14 and on either side of the chamber 14 bores 15 and 16. Beneath each of the bores 15 and 16 passageways 17 and 18 are provided which connect the chamber 14 with enlarged internally threaded bores 19 and 20 arranged at the outer ends of the bores 15 and 16.

The outer ends of each of the bores 15 and 16 are shown as internally threaded and closed by valve housings 21 having screw threaded engagement therewith. The enlarged internally threaded bores 19 and 20 are shown as closed by end caps 22. The valve housing 21 in the end of bore 15 and the valve housing 21 in the end of the bore 16 are similar and each includes a valve mechanism 21$^b$.

The valve housings 21 such as shown in details in Figs. 9 and 10 include a bore 23 terminating at one end in a conical valve seat 24 and at the other end in a screw threaded portion 25. Within the screw threaded portion 25 there is provided a plug 26 having a plurality of apertures 27 arranged around a central bore 28 (see Fig. 12).

Within the bore 23 is a valve indicated generally at 29. The valve 29 includes a conical head 30 and a shank 31 which terminates in a reduced end portion 32. The valve head 30 is adapted to be retained in tight engagement with the valve seat 24 by a coiled spring 33.

The valve head 30 is shown as provided with a surface groove 34 which decreases in depth and width from one end and which registers with an aperture 35 in the valve casing 21. As clearly shown in Fig. 10, an aperture 36 is provided in the valve 29 which extends from the larger portion of the groove 34 diagonally through the head 30 and the shank 31 and forms a passageway from the groove 34 to the bore 23 of the valve housing.

For turning the valve head 30 to present the groove 34 in various positions relative to the aperture 35 a stem 37 is provided which extends out through the cap 22 and is provided with an indicator 38. The indicator 38 is shown as adapted to point to a graduated scale 39 on the cap 22. The stem 37 is also provided with an enlarged portion 41 which surrounds the reduced end 32 of the valve shank 31 and has flattened portions 41$^a$ which engage flattened portions 42 on the reduced end 32. For preventing leakage through the cap 22 past the stem 37 a packing gland 43 is provided in the cap 22.

A piston 45 is mounted within the bore 15 for reciprocating movement and for preventing leakage past this piston 45 I provide a cup shaped packing ring 46 which is shown as adapted to be retained in position by a retainer ring 47. For normally urging the piston 45 to an extended or to a normal position as shown in Fig. 6 a coiled spring 48 is provided.

The piston 45 includes a bore 49 communicating with an enlarged bore 50 in which is mounted a valve mechanism 51. The shoulder at the juncture of the bores 49 and 50 is chamfered and forms a valve seat against which a ball valve 52 is normally urged by a coiled spring 53 and the spring 53 bears against an apertured washer 54. The inner end of the piston 45 is preferably plane and is provided with a transverse slot 54$^a$ of approximately the same width as the bore 49, as clearly shown in Fig. 15.

Mounted within the bore 16 for reciprocating movement I provide a similar piston 55 having a packing ring 56 retained in position by a ring 57. For normally urging the piston 55 to an extended position I provide a coiled spring 58.

The piston 55 like the piston 45 includes a bore 59 and an enlarged bore 60 in which is mounted a valve mechanism 61. The shoulder at the juncture of the bore 59 and 60 is chamfered to form a valve seat against which a valve ball 62 is normally urged by a coiled spring 63 and the spring 63 bears against an apertured washer 64. The inner end of the piston 55 is preferably rounded as clearly shown in the drawings and is provided with a transverse slot 65 of approximately the same width as the bore 59 (see Fig. 16).

Mounted within the chamber 14 there is provided a cam member 67. This cam 67 is supported in a bearing 68 afforded by the housing 13 and in a bearing 69 in a cap 70 which is adapted to act as a closure for the chamber 14. The cam member 67 includes a cam surface 71 and a cam surface 72 for coaction with the inner end of the piston 45 and a cap surface 73 for coaction with the inner rounded end of the piston 55.

For rocking the cam member 67 I provide a lever 74 having a tapered bore 75 at one end which fits over a tapered end portion 76 of the cam member 67. The tapered end portion 76 of the cam member 67 is provided with flattened portions 77 and the bore 75 of the lever 74 is also provided with flat portions 78 (see Fig. 17) which engage the flat portions 77 of the cam member and cause the two to move as a unit. The lever 74 is shown as retained on the tapered portion 76 of the cam member by a nut 79 which engages a reduced screw threaded end portion 80 of the cam member 67. The nut 79 may be prevented from turning as by a cotter pin 81 which extends through the nut and the screw threaded portion 80 of the cam member.

The interior of the housing 13 of my improved device 10 is preferably filled with a fluid such as oil as shown in Fig. 6. For filling the housing with oil I provide a screw plug 83 or any other suitable device.

For securing my device 10 to the side channel 11 of a vehicle frame I have shown apertured lugs 84 through which the shanks of bolts 85 may pass and be secured to the channel 11 by nuts 86 (see Figs. 1 and 3). For connecting the lever 74 to an axle of the vehicle upon which the device 10 is mounted I have shown in Figs. 1, 2 and 4 a novel form of connecting link and indicated it generally at 87.

This connecting link 87 includes two ball and socket joints 88 and 89 spaced apart and connected by a screw threaded rod 90. The joints 88 and 89 are identical in construction and therefore a detailed description of but one will be sufficient. In Fig. 14 I have shown an enlarged vertical section of the joint 88 which is adjacent the lever 74. The joint 88 comprises a cylindrical housing 91 which is spun over at one end as at 92 and internally threaded at the opposite end as at 93. Mounted within the housing 91 I provide a ball 94 which has a shank 95 adapted to pass through an aperture 96 in the end of the lever 74.

The shank 95 is provided with an enlarged portion 97 where it joins the ball 94 and between this enlarged portion and the lever 74 I clamp a grease retaining cap 98. This cap 98 is preferably made of spring material and tightly engages the end 92 of the housing 91.

For retaining the ball 94 against the end 92 of the housing 91 I provide a heavy coiled spring 99 which may be made of material rectangular in section and one end of which bears against a ball seat 100 loosely mounted in the housing 91. The opposite end of the spring 99 bears against a screw threaded plug 101 which engages the screw threaded end 93 of the housing 91. The tension of the spring 99 may be adjusted by moving this plug 101 either in or out by rotating it in the correct direction. The plug 101 is shown as adapted to be locked against rotation by a nut 102.

The plug 101 is provided with a central screw threaded aperture 103 by which it is engaged by one end of the screw threaded rod 90. For placing a lubricant such as grease within the housing 91 I may provide a fitting 104 of any suitable character. By means of the rod 90 the distance between the joints 88 and 89 may be varied and for locking the rod 90 against rotation I provide a nut 105.

The joint 88 is shown as secured to the lever 74 by a nut 106 and the joint 89 is shown as secured to a bracket 107 by a nut 108. As shown in Figs. 1, 2, and 3, the bracket 107 is secured to the front axle 12 of the vehicle by clamping it against the axle 12 with the nuts 109 of one of the U-bolts 110 which secure the vehicle leaf spring 111 to the axle 12.

When a wheel of the vehicle on which my device 10 is mounted goes over an obstruction and causes the axle 12 to move towards the chassis channel 11 the link 87 will cause the lever 74 to move to the position shown in Figs. 2 and 7. As the lever 74 moves upward it rocks the cam member 67 towards the piston 45. The cam surface 72 does not abut the end of the piston 45 until the lever 67 has moved a considerable distance as shown by the broken lines in Fig. 6. When the cam surface 72 abuts the end of the piston 45 it moves the piston outward or to a retracted position as shown in Fig. 7. As the piston is retracted the spring 58 forces the piston 55 to an extended position and retains the rounded end of the piston 55 against the cam surface 73 of the cam member 67.

When the piston 45 is moved to a retracted position and the piston 55 to an extended position the fluid in the bore 15 in the rear of the packing 46 is forced through the aperture 35 in the valve housing 21 of the valve mechanism 21ª and into the groove 34 in the valve head 30. From the groove 34 the fluid passes through the aperture 36 into the bore 23 and through the aperture 27 of the plug 26 into the enlarged bore 19 (see Fig. 10). From the bore 19 it passes through the passageway 17 into the chamber 14 as clearly shown by the arrows in Fig. 7.

As the piston 55 moves to an extended position the fluid is caused to pass through the bore 59 unseating the ball valve 62 of the valve mechanism 61. After passing the ball valve the fluid passes through the apertured washer 64 into the bore 16.

When the lever 74 is caused to move to a down position as shown by the broken lines in Fig. 2, by the axle 12 moving further away from the chassis channel 11, the cam member 67 is rocked to the position shown in Fig. 8. When the cam member 67 is thus rocked it forces the piston 55 to a retracted position and allows the piston 45 to assume its normal position as clearly shown in Fig. 8. As the piston 55 is moved to a retracted position it forces the fluid behind the packing 56 in the bore 16 through the aperture 35 in the valve housing 21 of the valve mechanism 21ᵇ and into the groove 34 in the valve head 30. From the groove 34 the fluid passes through the aperture 36 into the bore 23 and through the apertures 27 of the plug 26 into the enlarged bore 20. From the bore 20 it passes through the passageway 18 into the chamber 14 as clearly shown by the arrows in Fig. 8.

As the piston is forced to an extended position by the spring 48 the fluid is caused to pass through the bore 49 unseating the ball valve 52 of the valve mechanism 51 and through the apertured washer 54 into the bore 15.

The slot 54ª in the end of the piston 45 and the slot 65 in the end of the piston 55 prevent the cam member 67 from interfering with the free flow of the fluid into the bores 49 and 59.

The valve mechanisms 21ª and 21ᵇ are so constructed that during the normal operation of the device the spring 23 will retain the valve head 30 in tight contact with the valve seat 24, thereby causing the fluid to flow in the conical groove 34 and through the aperture 36 into the bore 23. But if the valve head 30 is accidentally turned to a position where the conical groove 34 does not register with the aperture 35 and the pistons are caused to move, the overload fluid pressure will force the valve head 30 out of contact with the valve seat 24 against the action of the spring 33 and allow the fluid to pass by the valve head and into the bore 23 from whence it will pass through the apertures 27 in the plug 26 and return to the chamber 14 as previously described. If the valve head 30 should be turned so that the narrowest portion of the conical groove 34 registers with the aperture 35 as shown in Fig. 13, and the pistons should be caused to move much faster than normal to cause a high fluid pressure, the valve head 30 would be unseated and allow the fluid to pass as previously described.

By providing the dual fluid flow control and overload valve mechanisms 21ª and 21ᵇ there is no possible chance for the valve mechanisms to become inoperative and cause damage to some part of the device.

From the foregoing description it will be apparent that I have provided a novel hydraulic spring control device which is positive in operation at all times, simple in construction, readily installed and can be economically manufactured.

What I claim is:

1. In a device of the class described, a housing, a pair of pistons mounted for movement in said housing, means to normally urge each piston in one direction, means for causing movement of said pistons in another direction, said means including a cam member adapted to move each of said pistons, said cam member being so constructed whereby initial movement thereof in one direction is independent of movement of one piston but continued movement thereof causes the cam member to coact with the said one piston to move it.

2. In a shock absorber, a housing having a central cavity therein, a plurality of opposed cylinders, a closure for one end of each cylinder, a valve associated with said closure, said valve including a valve housing having a cavity and a conical seat therein, said seat having an aperture between the valve housing cavity and the cylinder, a conical valve on said valve seat, said valve having a recess therein communicating with said aperture, and means affording communication between the valve cavity and the central cavity.

3. In a device of the class described a housing including a chamber, bores oppositely extending from either side of said chamber, pistons in each of said bores, packing means on each of said pistons for forming a fluid tight seal between said pistons and said bores and spring means in each of said bores for normally urging each of said pistons toward the other, passageways adjacent to said bores, the ends of each of said bores communicating with an enlarged bore and each of said enlarged bores communicating with one of said adjacent passageways, the outer ends of each of said first mentioned bores being closed by a valve housing, said valve housing including a bore and a valve seat, and a valve in said last bore.

4. In a device of the class described, a valve mechanism including a valve housing having a bore and a valve seat, a valve in said bore including a head and a shank, said valve housing having an aperture communicating with said valve seat, said head having a groove on the surface thereof communicating with said aperture, said valve head and said shank having an aperture communicating with said groove on said valve head and said bore in said valve housing thereby forming a passageway from said aperture in said valve housing to said bore in said valve housing.

5. In a device of the class described, a housing including a chamber, bores oppositely extending from either side of said chamber, a piston in each of said bores, an axial bore in each of said pistons, valve means in each of said bores arranged to open by fluid pressure when said pistons move towards said chamber and to automatically close when said pistons move away from said chamber, a member interposed between the adjacent ends of said pistons, cam surfaces on said member for moving said pistons, grooves in the ends of each of said pistons communicating with said axial bores of said pistons, said grooves forming fluid passageways into the bore of said pistons, a lever secured to said member for rocking it and means to connect said lever to a moving part to impart movement to said lever.

6. In a device of the class described, a valve mechanism including a valve housing, said valve housing including a bore and a valve seat, a valve in said bore including a head and a shank, means to normally urge said valve head into tight contact with said valve seat, a plug in the end of said bore in said valve housing having apertures therethrough to form passageways from said bore in said valve housing, an aperture in said valve housing communicating with said valve seat, a tapered groove on the surface of said valve head coacting with said aperture in said valve housing, an aperture extending through said valve head and said shank to afford communication between said groove on said valve head and said bore in said valve housing.

7. In a device of the class described, a housing including a chamber having bores extending therefrom, a piston in each of said bores, a member interposed between the pistons, cam surfaces on said member coacting with said pistons, one of said cam surfaces being so arranged that upon a rocking of said member the piston which engages it will be caused to move the entire duration of the rocking of said member, the other of said cam surfaces being so arranged that upon a rocking of said member said other piston will move during a portion only of the rocking of said member.

8. In a device of the class described, a housing including a chamber, bores oppositely extending from either side of said chamber, a piston in each of said bores, packing means on each of said pistons for forming a fluid tight seal between said pistons and said bores, spring means in each of said bores for normally urging each of said pistons towards each other, a cam member interposed between the adjacent ends of said pistons, cam surfaces on said cam member engaging the ends of each of said pistons, one of said cam surfaces being so arranged that upon a rocking of said cam member the piston which engages it will be caused to move the entire duration of the rocking of said cam, the other of said cam surfaces being so arranged that upon a rocking of said cam member said coacting piston will not move the entire duration of the rocking of said cam and valve controlled means causing fluid circulation from the chamber through each piston and back to said chamber when said cam is rocked.

9. In a device of the class described, a housing including a chamber, bores oppositely extending from either side of said chamber, a piston in each of said bores, means for forming a fluid tight seal between said pistons and said bores, spring means in each of said bores for normally urging each piston toward the other, an axial bore in each of said pistons, valve means in each of said axial bores the valve in each piston being arranged to open by fluid pressure when the piston moves towards said chamber and to automatically close when the piston moves away from said chamber, a member interposed between the adjacent ends of said pistons, cam surfaces on said member engaging one end of each of said pistons, grooves in the ends of each of said pistons communicating with said axial bores of said pistons, said grooves forming fluid passageways whereby the contact of said member with the ends of said pistons will allow free flow of fluid into said axial bore of said pistons, one of said cam surfaces being so arranged that upon a rocking of said member the piston which engages it will be caused to move the entire duration of the rocking of said member, the other of said cam surfaces being so arranged that upon a rocking of said member said coacting piston will not move the entire duration of the rocking of said member, a lever secured to said member for rocking said member, means to connect said lever to a moving part to impart movement to said lever and means to return fluid, which passes through said pistons, to said chamber.

10. In a device of the class described, a housing including a chamber, bores oppositely extending from each side of said chamber, pistons in each of said bores, means for forming a fluid tight seal between said pistons and said bores, means in each of said bores for normally urging each of said pistons toward the other, passageways beneath said bores, one end of each of said bores communicating with an enlarged bore and the outer ends of each of said first mentioned bores being closed by a valve housing, said valve housing including a valve bore and a valve seat, a valve in said valve bore including a head and a shank, said valve head being normally urged into tight contact with said valve seat by spring means, means in said valve housing to form passageways from said bore in said valve housing to said enlarged bores in said first mentioned housing, said valve housing having an aperture communicating with said valve seat of said valve housing, a groove on the surface of said valve head coacting with said aperture in said valve housing, said valve head and said shank having an aperture communicating with said groove on said valve head and said bore in said valve housing thereby forming a passageway from said first mentioned bores in said first mentioned housing to said bores in said valve housing.

11. In a device of the class described a housing including a chamber, bores extending from said chamber, passageways adjacent said bores, the outer ends of each of said bores communicating with an enlarged bore and the outer ends of each of said first mentioned bores being closed by a valve housing, each of said valve housings including a bore and a valve seat, a valve in said bore including a head and a shank, said valve head being normally urged into tight contact with said valve seat, means to provide communication between said bore in said valve housing to said enlarged bores in said first mentioned housing, an aperture in said valve housing communicating with said valve seat of said valve housing, a groove on the surface of said valve head coacting with said aperture in said valve housing, an aperture in said valve communicating with said groove on said valve head and said bore in said valve housing, thereby forming a passageway from said first mentioned bores in said first mentioned housing to said bores in said valve housing, pistons in each of said first mentioned bores in said first mentioned housing, an axial bore in each of said pistons, valve means in each of said axial bores arranged to open by fluid pressure when said pistons move towards said previously mentioned chamber and to automatically close when said pistons move away from said chamber, a cam member interposed between the adjacent ends of said pistons, said cam member engaging the ends of each of said pistons, grooves in the ends of each of said pistons communicating with said axial bores of said pistons, said grooves forming fluid passageways whereby the contact of said cam member with the ends of said pistons will not interfere with the free flow of fluid into said axial bore of said pistons.

12. In a spring control device a housing including a chamber, bores oppositely extending from either side of said chamber, passageways beneath said bores, the outer ends of each of said bores communicating with an enlarged bore and the outer ends of each of said first mentioned bores being closed by a valve housing, said enlarged bores being closed by end caps, said valve housing including a bore and a valve seat, a valve in said valve bore including a head and a shank, said valve head being normally urged into tight contact with said valve seat by spring means, a plug in the end of said valve bore having apertures therethrough to form passageways from said bore in said valve housing to said enlarged bores in said first mentioned housing, an aperture in said valve housing communicating with said valve seat of said valve housing, a groove on the surface of said valve head coacting with said aperture in said valve housing, an aperture in said valve head and said shank and communicating with said groove on said valve head and said bore in said valve housing, thereby forming a passageway from said first mentioned bores in said first mentioned housing to said bores in said valve housing, means extending through said plug in said valve housing and through said previously mentioned end cap for turning said valve in said valve housing, a piston in each of said first mentioned bores in said first mentioned housing, means on each of said pistons for forming a fluid tight seal between said pistons and said bores, spring means in each of said bores for normally urging each of said pistons toward the other, an axial bore in each of said pistons, valve means in each of said axial bores arranged to open by fluid pressure when said pistons move towards said chamber and to automatically close when said pistons move away from said chamber, a cam member interposed between the adjacent ends of said pistons, cam surfaces on said cam member engaging the end of each of said pistons, grooves in the ends of each of said pistons communicating with said axial bores of said pistons, said end grooves forming fluid passageways whereby the contact of said cam member with the ends of said pistons will not interfere wth the free flow of fluid into said axial bore of said pistons, one of said cam surfaces being so arranged that upon a rocking of said cam member the piston which engages it will be caused to move the entire duration of the rocking of said cam, the other of said cam surfaces being so arranged that upon a rocking of said cam member said coacting piston will not move the entire duration of the rocking of said cam, a lever secured to said cam member for rocking it and means to connect said lever to a moving part to impart movement thereto.

13. In a device of the class described, a housing including a chamber, bores oppositely extending from either side of said chamber, passageways beneath said bores, the outer ends of each of said bores communicating with an enlarged bore and the outer ends of each of said first mentioned bores being closed by a valve housing, said enlarged bores being closed by end caps, said valve housing including a bore and a valve seat, a valve in said valve bore including a head and a shank, said valve head being normally urged into tight contact with said valve seat by spring means, a plug in the end of said valve bore having apertures therethrough to form passageways from said bore in said valve housing to said enlarged bores in said first mentioned housing, an aperture in said valve housing communicating with said valve seat of said valve housing, a groove on the surface of said valve head coacting with said aperture in said valve housing, an aperture extending through said valve head and said shank and communicating with said groove on said valve head and said bore in said valve housing thereby forming a passageway from said first mentioned bores in said first mentioned housing to said bores in said valve housing, means extending through said plug in said valve housing and through said previously mentioned end cap for turning said valve in said valve housing, a piston in each of said first mentioned bores in said first mentioned housing, means on each of said pistons for forming a fluid tight seal between each piston and its bore, spring means in each of said bores for normally urging each of said pistons towards the other, an axial bore in each of said pistons, valve means in each of said piston bores arranged to open by fluid pressure when said pistons move towards said chamber and to automatically close when said pistons move away from said chamber and means to move said pistons.

In testimony whereof, I hereunto affix my signature.

WILLIAM H. SCHMITT.